US006950018B2

(12) United States Patent
Merrell et al.

(10) Patent No.: US 6,950,018 B2
(45) Date of Patent: Sep. 27, 2005

(54) ALARM SYSTEMS, ALARM DEVICES, ALARM ACTIVATION METHODS, ALARM SYSTEM RETROFITTING METHODS, AND ALARM SYSTEM NETWORK ESTABLISHMENT METHODS

(75) Inventors: Daniel B. Merrell, Mesa, AZ (US); Joseph R. Goetz, Gilbert, AZ (US)

(73) Assignee: PAS Alert, LLC, Queen Creek, AZ (US)

( * ) Notice: Subject to any disclaimer, the term of this patent is extended or adjusted under 35 U.S.C. 154(b) by 0 days.

(21) Appl. No.: 10/155,524

(22) Filed: May 23, 2002

(65) Prior Publication Data

US 2002/0175811 A1 Nov. 28, 2002

Related U.S. Application Data

(60) Provisional application No. 60/293,641, filed on May 24, 2001.

(51) Int. Cl.[7] .............................. G08B 1/08; H04Q 7/00

(52) U.S. Cl. .............................. 340/539.1; 340/539.14; 340/539.16; 340/539.17; 340/531; 340/7.2

(58) Field of Search ......................... 340/539.1, 539.14, 340/539.16, 539.17, 539.26, 531, 7.2

(56) References Cited

U.S. PATENT DOCUMENTS

| | | | | | |
|---|---|---|---|---|---|
| 3,818,345 | A | * | 6/1974 | Miya et al. | 455/517 |
| 3,833,895 | A | * | 9/1974 | Fecteau | 340/505 |
| 3,909,826 | A | * | 9/1975 | Schildmeier et al. | 340/524 |
| 3,925,763 | A | * | 12/1975 | Wadhwani et al. | 340/825.36 |
| 4,189,720 | A | * | 2/1980 | Lott | 340/539.26 |
| 4,257,038 | A | * | 3/1981 | Rounds et al. | 340/539.16 |
| 4,688,026 | A | * | 8/1987 | Scribner et al. | 235/385 |
| 4,692,742 | A | * | 9/1987 | Raizen et al. | 340/539.22 |
| 4,812,820 | A | * | 3/1989 | Chatwin | 340/518 |
| 4,856,047 | A | * | 8/1989 | Saunders | 340/7.55 |
| 4,887,291 | A | * | 12/1989 | Stillwell | 379/39 |
| 4,951,029 | A | * | 8/1990 | Severson | 340/506 |
| 5,386,209 | A | * | 1/1995 | Thomas | 340/539.14 |
| 5,400,246 | A | | 3/1995 | Wilson | 340/825.36 |
| 5,686,886 | A | * | 11/1997 | Stensney | 340/539.14 |
| 5,831,526 | A | * | 11/1998 | Hansler et al. | 340/539.14 |
| 6,346,890 | B1 | * | 2/2002 | Bellin | 340/825.52 |

FOREIGN PATENT DOCUMENTS

| | | |
|---|---|---|
| DE | 201 01 191 | 5/2001 |
| EP | 0 939 944 A | 9/1999 |
| EP | 02 73 7186 | 10/2004 |
| WO | WO 0122701 A | 3/2001 |

* cited by examiner

*Primary Examiner*—Donnie L. Crosland
(74) *Attorney, Agent, or Firm*—Wells St. John P.S.

(57) ABSTRACT

An alarm system includes at least one wireless alarm transmitter, at least one wireless activate transmitter, and at least one wireless signal receiver. The signal receiver becomes sensitized to recognize an alarm code from the alarm transmitter after recognizing an activate code from the activate transmitter. The signal receiver can include an alarm generator that provides a first alarm after recognizing the alarm code. An alarm device can include a wireless hazard signal receiver that becomes sensitized to recognize a wireless transmitted hazard alarm code only after recognizing a wireless transmitted activate code. An alarm generator can provide a hazard alarm after recognizing the alarm code. The device can further include an alarm code and activate code decryption device. Instead of or in addition to the activate transmitter and sensitizing feature, the system can be equipped to display a location name in the alarm generator as a text alarm.

23 Claims, 4 Drawing Sheets

ALARM SYSTEMS, ALARM DEVICES, ALARM ACTIVATION METHODS, ALARM SYSTEM RETROFITTING METHODS, AND ALARM SYSTEM NETWORK ESTABLISHMENT METHODS

RELATED PATENT DATA

This patent resulted from U.S. Provisional Patent Application Ser. No. 60/293,641, filed on May 24, 2001.

TECHNICAL FIELD

The present invention pertains to alarm devices and alarm systems, including alarm activation methods and alarm system retrofitting methods, as well as methods of establishing an alarm system network.

BACKGROUND OF THE INVENTION

Residential and commercial buildings often include a variety of alarms and alarm systems that may or may not be associated with a hazard detector. For example, local and/or state fire codes often require fire detectors, including but not limited to smoke detectors, in buildings that may be occupied. A variety of systems are available. A building may include a stand alone fire detector that provides an alarm directly from the stand alone unit upon detecting a predetermined fire condition. In another system, several fire detectors can be wired together such that when one detector provides an alarm, the other linked detectors also provide an alarm. In still another system, alarm generators separate from detectors can be wired to a central control panel, such that when one detector identifies a fire condition, the central control panel actuates some or all of the alarm generators to produce an alarm. Analogous devices and systems can also be used for detection of carbon monoxide and security breaches.

One problem of existing alarm systems, is that hearing impaired persons may experience difficulty in recognizing the warning of a hazard condition. They might not hear an alarm or notice other people responding to an alarm and thus fail to become aware of an emergency situation. One attempt at resolving such a circumstance uses strobe lights or other warning lights to visually warn of a hazard condition. However, providing such lighting arrangements in every space within a building that may be occupied can be difficult and costly. Further, a hearing impaired person sleeping at home or being outside a home might not become aware of a hazard condition within the home.

Accordingly, an improvement in alarm systems is needed at least to alert hearing impaired persons of hazard conditions.

SUMMARY OF THE INVENTION

According to one aspect of the invention, an alarm system includes at least one wireless alarm transmitter, at least one hazard condition detector equipped to prompt the alarm transmitter to send an alarm code after identifying at least one hazard condition, and at least one wireless signal receiver equipped to recognize the alarm code. The signal receiver can include an alarm generator equipped to provide at least a text alarm as a first alarm after recognizing the alarm code, the text alarm naming a location of the hazard condition detector that identified the hazard condition.

Additionally, an alarm device can include a wireless hazard signal receiver that becomes sensitized to recognize a wireless transmitted hazard alarm code only after recognizing a wireless transmitted activate code. An alarm generator can provide a hazard alarm after recognizing the alarm code. The alarm device can further include an alarm code and activate code decryption device. The alarm code can include a combined location code and condition code and the activate code can include the location code, but not the condition code.

In another aspect of the invention, an alarm system includes at least one wireless alarm transmitter, at least one wireless activate transmitter, and at least one wireless signal receiver. The signal receiver becomes sensitized to recognize an alarm code from the alarm transmitter after recognizing an activate code from the activate transmitter. The signal receiver can include an alarm generator that provides a first alarm after recognizing the alarm code. The activate transmitter can exhibit a lower transmission range in comparison to the alarm transmitter. Accordingly, the activate transmitter can be positioned to exhibit an effective transmission range substantially encompassing at least one entrance of a limited access structure. The alarm transmitter can be positioned to exhibit an effective transmission range encompassing at least a portion of the limited access structure. One example of a signal receiver includes a personal paging device. Further, the location code can be unique to a limited access structure in comparison to structures within the same nation.

In another aspect of the invention, an alarm activation method includes transmitting an activate code from at least one wireless activate transmitter, recognizing the activate code with at least one wireless signal receiver, and after recognizing the activate code, sensitizing the signal receiver to recognize at least one alarm code. The alarm code can be transmitted from at least one wireless alarm transmitter and recognized with the signal receiver after sensitizing the signal receiver. After recognizing the alarm code, a first alarm can be provided from an alarm generator comprised by the signal receiver. The method can further include encrypting the activate code and the alarm code prior to transmitting such codes and decrypting the activate code and the alarm code prior to recognizing such codes.

In a still further aspect of the invention, an alarm activation method can include transmitting first data from a first arrangement of wireless transmitters at entrances of a building. The first transmitter arrangement can provide a combined effective transmission range extending only throughout substantially all of any space through which the building may be entered and any portions of any space immediately adjoining the entrances. The method can further include recognizing the first data with at least one wireless signal receiver and after recognizing the first data, sensitizing the signal receiver to recognize second data. Second data can be transmitted from a second arrangement of wireless transmitters in the building. The second transmitter arrangement can provide a combined effective transmission range extending throughout substantially all of any space that may be occupied within the building. After sensitizing the signal receiver as an indication of the signal receiver entering the building, second data can be recognized with the signal receiver. After recognizing the second data, an alarm can be provided from an alarm device comprised by the signal receiver as an indication of a predetermined condition.

An additional aspect of the invention provides an alarm system retrofitting method that includes linking at least one added wireless alarm transmitter with an existing alarm system, the link allowing an alarm actuation signal of the existing alarm system to be extended to the wireless alarm transmitter. At least one added wireless signal receiver can be provided that is equipped to recognize an alarm code from the alarm transmitter, the signal receiver comprising an alarm generator equipped to provide at least a text alarm as a first alarm after recognizing the alarm code. The text alarm may name a location of a hazard condition detector that generated the alarm actuation signal.

Also, an alarm system retrofitting method can include linking at least one added wireless transmitter with an existing alarm system. The link can allow an alarm actuation signal of the existing alarm system to be extended to the wireless alarm transmitter. The method further includes providing at least one added wireless activate transmitter and at least one added wireless signal receiver. The signal receiver can become sensitized to recognize an alarm code from the alarm transmitter after recognizing an activate code sent by the activate transmitter. The signal receiver can include an alarm generator that provides an alarm after recognizing the alarm code.

In a further aspect of the invention, an alarm system network establishment method includes disseminating wireless first alarm transmitters and disseminating wireless signal receivers. The signal receivers can be continuously sensitized to a first alarm code from the first alarm transmitters and can include an alarm generator that provides a first alarm after recognizing a first alarm code. The method further includes promoting purchase and installation of alarm systems including wireless second alarm transmitters and wireless activate transmitters. The signal receivers can become sensitized to recognize a second alarm code from the second alarm transmitters after recognizing an activate code from the activate transmitters. The alarm generator can provide a second alarm after recognizing the second alarm code.

BRIEF DESCRIPTION OF THE DRAWING

Preferred embodiments of the invention are described below with reference to the following accompanying drawings.

DETAILED DESCRIPTION OF THE PREFERRED EMBODIMENTS

The various aspects of the inventions described below are particularly suitable for ensuring that hearing impaired persons are warned of hazard conditions existing within a building. However, as will be readily understood by one of ordinary skill, the concepts of the inventions discussed herein are applicable to other uses. For example, sight impaired persons might benefit from such inventions. Also, the inventions might be useful in providing an alarm of a predetermined condition rather than just a hazard condition. A predetermined condition can include hazard conditions as well as a variety of other circumstances for which a desire exists to notify persons of the condition's existence. Accordingly, an "alarm" as used in the context of the present document includes various alerts, warnings, notifications, etc. and is not limited to emergency or hazard condition alarms. For example, an alarm might notify a hearing impaired person of an incoming telephone call.

Also, the inventions herein are not confined to use in limited access structures, such as buildings, through they are particularly useful in such structures. According to at least some aspects of the invention, an individual's presence in a limited access structure provides activation of a signal receiver to recognize transmission of alarm signals pertinent to a particular one of such structures. Other uses, applications, and aspects of the inventions can also be envisioned.

Figure 1:
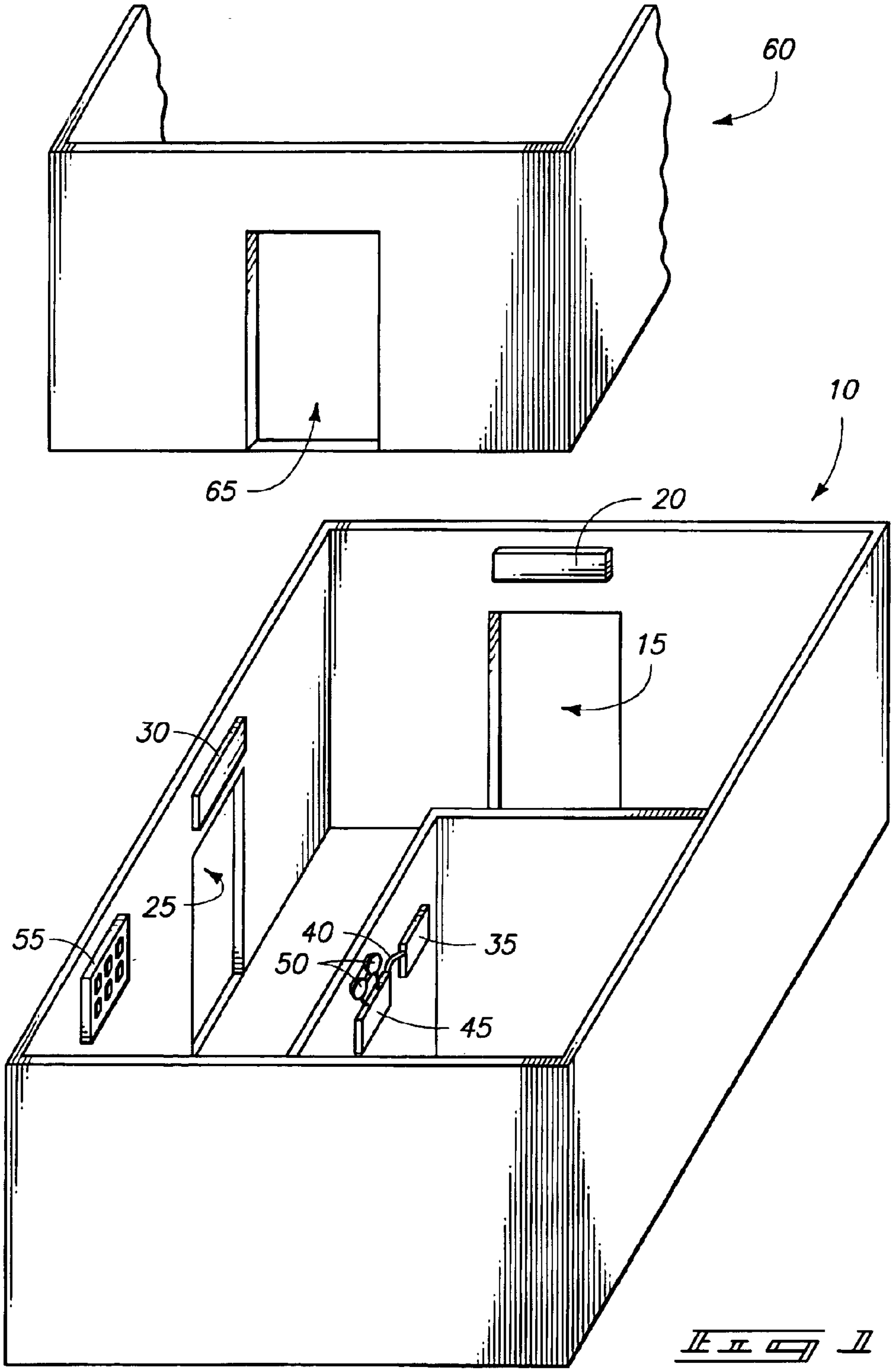
FIG. 1 shows a perspective view of an alarm system associated with a first structure and not associated with an adjoining second structure.
Figure 2:
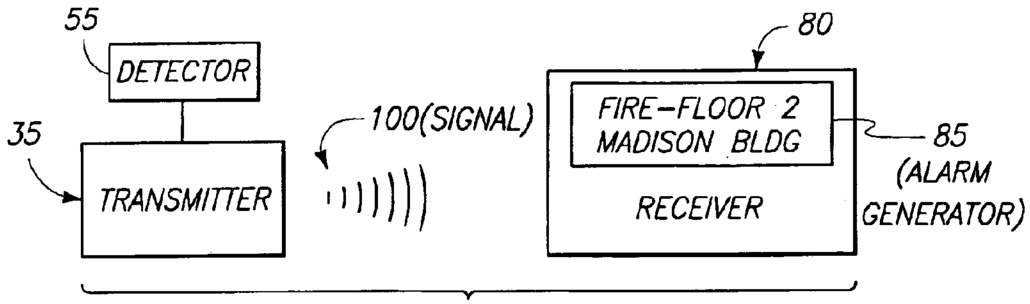
FIGS. 2–10 show schematic views of alarm system alternative embodiments according to various aspects of the inventions.
Figure 3:
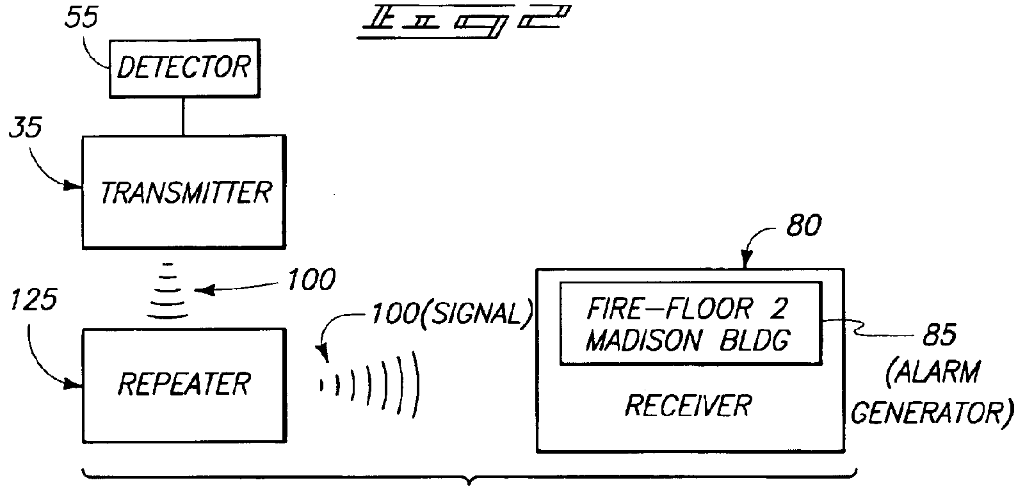

In one aspect of the invention, an alarm system includes at least one wireless alarm transmitter, at least one wireless activate transmitter, and at least one wireless signal receiver. Turning to FIG. 1, a first structure 10 is shown in perspective view to illustrate the invention and not by way of limitation. First structure 10 is a limited access structure since the walls are closed to access except at specifically identified access points, namely an entrance 15 and an entrance 25. Most buildings are limited access structures. However, other limited access structures exist and the invention is also applicable to structures not having limited access. Such general access structures include structures where entry can be accomplished at various exterior parts of the structure rather than at a specifically identified entrance. Examples can include a structure only having a roof and no closed exterior walls, temporary structures such as some types of tents, and other structures. The aspects of the invention described herein apply particularly to limited access structures, but also apply to other structures and can even be used outdoors in the absence any structure other than devices positioning the alarm transmitter and activate transmitter.

The signal receiver can become sensitized to recognize an alarm code from the alarm transmitter after recognizing an activate code from the activate transmitter. As shown in FIG. 1, a first transmitter 20 and a first transmitter 30 are positioned over respective entrances 15 and 25. First transmitters 20 and 30 can be activate transmitters positioned to exhibit an effective transmission range substantially encompassing at least one entrance of a limited access structure. First transmitters 20 and 30 might instead or additionally perform other functions. Notably, transmitters 20 and 30 are preferably wireless. The term "wireless transmitter" refers to devices capable of transmitting an output signal 100 (e.g., see FIGS. 2–9) without the need of wiring as a medium for transmitting the signal. However, such term does not indicate whether input signals are received by wireless transmission or through wiring. Similarly, "wireless receiver" refers to devices that receive input signals by wireless transmission, but does not indicate whether output signals, if any, are sent wireless or through wiring.

Wireless transmitters typically exhibit a limited transmission range. Such range often includes an effective portion, wherein transmission and reception occurs reliably, and an outer, less effective or ineffective portion where transmission and/or reception can be intermittent or unreliable. Standards for transmission known to those skilled in the art can be used to determine an effective transmission range depending on the particular devices and circumstances of transmission, such as obstructions, interference, weather, etc.

The effective transmission range of first transmitters 20 and 30 can substantially encompass respective entrances 15 and 25. "Substantially encompassing" an entrance refers to providing a range such that a signal receiver passing through such entrance in a normal mode of transportation will receive the signal from the transmitter associated with the entrance. "Substantially encompassing" does not necessarily indicate that the entire space comprising entrance 15 or 25 is encompassed by the effective transmission range, but it is possible.

The activate transmitter and the alarm transmitter can exhibit similar transmission ranges. However, preferably the activate transmitter exhibits a lower transmission range in comparison to the alarm transmitter. In this manner, a signal receiver passing through an entrance, such as entrance 15 or 25, can become sensitized to recognize an alarm code from the alarm transmitter after recognizing an activate code from the activate transmitter. The transmission ranges of the transmitters is influenced by the type of transmitter, the electrical power used to generate the transmission, signal frequency, surrounding obstructions, and other factors known to those skilled in the art. With such knowledge at hand, first transmitters 20 and 30 can be designed to primarily encompass respective entrance 15 and 25 without substantially extending the transmission range to other portions of first structure 10 or surrounding spaces. For example, an activate transmitter can exhibit an effective transmission range extending only throughout substantially all of a space through which a structure may be entered and any space immediately adjoining the entrance. Preferably, the effective transmission range extends only throughout substantially all of the space through which the structure may be entered. However, it is likely more cost effective to instead provide a transmission range in such space as well as any portions of any space immediately adjoining the entrance.

In contrast, the alarm transmitter can be positioned to exhibit an effective transmission range encompassing at least a portion of a limited access structure. As shown in FIG. 1, a second transmitter 35 is positioned within first structure 10. Second transmitter 35 can be an alarm transmitter positioned to exhibit the described effective transmission range. Preferably, the alarm transmitter, perhaps combined with other alarm transmitters, can provide a combined effective transmission range extending throughout substantially all of any space that may be occupied within the structure. The other alarm transmitters can include transmitters similar to second transmitter 35 and/or they can merely be transmission repeaters possessing features known to those skilled in the art for such devices, such as a repeater 125 shown in FIG. 3. In this manner, a signal receiver can become sensitized to recognize an alarm code upon entrance into a structure and then remain in a condition to recognize an alarm code from alarm transmitters having combined transmission ranges encompassing the structure.

The signal receiver can remain sensitized to such structure until passing through an entrance of a different structure and becoming sensitized to recognize an alarm code from alarm transmitters of the different structure. FIG. 1 shows second structure 60 including an entrance 65 outside of the space immediately adjoining entrances 15 and 25. As long as the effective transmission range of first transmitters 20 and 30 does not extend to include entrance 65, a signal receiver becoming sensitized by first transmitter 20 or 30 can be a near positive indication of entry into first structure 10. In such a manner, a signal receiver can enter first structure 10 and be sensitized to recognize an alarm code from second transmitter 35 without being sensitized to recognize an alarm code from a different transmitter that may exist within other structures, such as second structure 60. Becoming sensitized might also occur upon passing close by an entry into first structure 10, but not entering. However, a user could readily realize the false sensitization since no structure was entered. The signal receiver could then become properly sensitized to a particular structure upon later entering such structure.

It may advantageous in providing the above described concepts to have the alarm code include a combined location code and condition code and have the activate code include the location code, but not the condition code. Accordingly, as a signal receiver enters first structure 10, the signal receiver can recognize the location code portion of the activate code and become sensitized to subsequent transmission of the same location code in combination with a condition code (that is, the alarm code). As one example, the location code can be unique to a particular limited access structure. In particular, the location code can be unique in comparison to structures within the same nation. Alternatively, the location code can be unique among structures within the same continent or even within the world. As another example, a location code can consist of 12 data bits and the condition code can consist of 4 data bits. Thus, a 16 bit transmitter and receiver can accommodate the aspects of the invention described herein. Preferably, the location code may be much longer to allow for decoding into an alphanumeric display that is human readable and indicative of a particular location. The use of unique identifiers for specific structures allows a signal receiver to enter any building equipped with the alarm systems described herein and to become sensitized to recognize alarm codes generated for the particular structure. Little concern would exist for receiving false alarm codes pertaining to other structures. In this manner, a hearing impaired person can own just one signal receiver and yet be warned of hazard conditions in any variety of structures.

As shown in FIGS. 2–9, a signal receiver 80 can further include an alarm generator 85 that provides a first alarm after recognizing the alarm code of a signal 100. The particular alarm generated can be tailored to a particular type of receiver or a particular application of use. For example, the signal receiver can be mobile, including, but not limited to, a personal paging device. The alarm generator can provide an alarm including at least one of light, text (as shown in FIGS. 2–10), motion, and sound, as well as perhaps other alarms. In the cases of a personal pager, the light can include a flashing light emitting diode (LED), the text can include a liquid crystal diode (LCD) display, the motion can include a vibration mechanism, and the sound can include intermittent beeping. Some personal pagers are equipped to provide all four alarms and particular alarms can be selected or deselected according to a user's preferences.

The various potential alarms can be used to provide a different alarm for different conditions. The alarm generator can provide a different alarm for a fire condition compared to at least one of a carbon monoxide condition, security breach condition, and emergency broadcast condition. For example, the LED, vibration mechanism, and beeping can all be provided in similar alarm modes namely, constant pulse, fast pulse, slow pulse, two short pulses followed by three second pause, and long pulse-short pulse in repetitive sequence. The LCD display can additionally provide some sort of text in accordance with a particular alarm mode. The constant pulse might be associated with a fire condition, as a more common condition in need of urgent attention. Fast pulsing might be associated with a carbon monoxide condition, a less common condition in need of extremely urgent attention. Slow pulsing might be associated with a security breach condition, depending on the circumstances, a potentially less urgent condition. Two short pulses followed by a three second pause might be associated with a warning issued by the Emergency Broadcast System.

Other alarm modes or variations of indicated alarm modes are possible and can be associated with condition codes based on a variety of preferences. The alarm generator of the signal receiver can even be used to provide a notification each time a signal receiver becomes sensitized to recognize an alarm code. For example, a single two second pulse of at least one of light, motion, and sound, with or without accordant text, can notify a user that the signal receiver sensitized to a particular structure upon entry.

Figure 7:
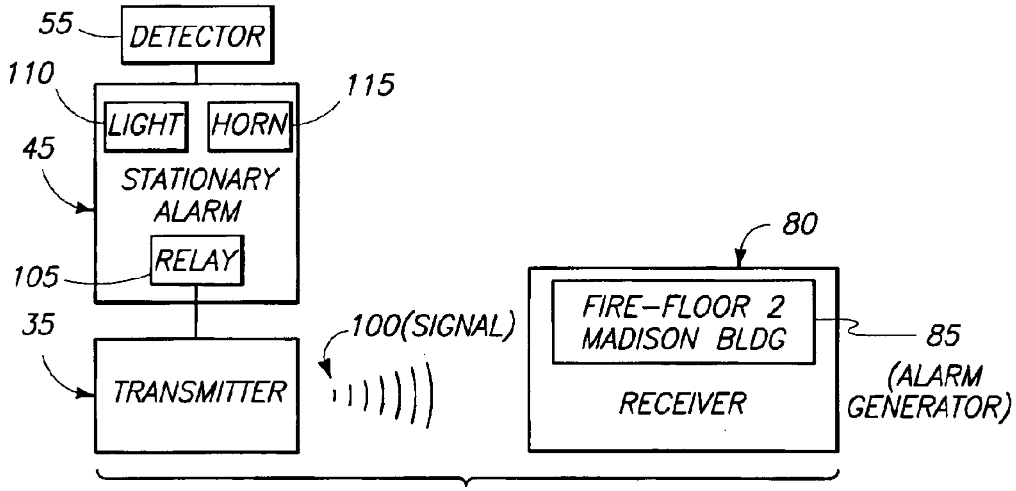
Figure 8:
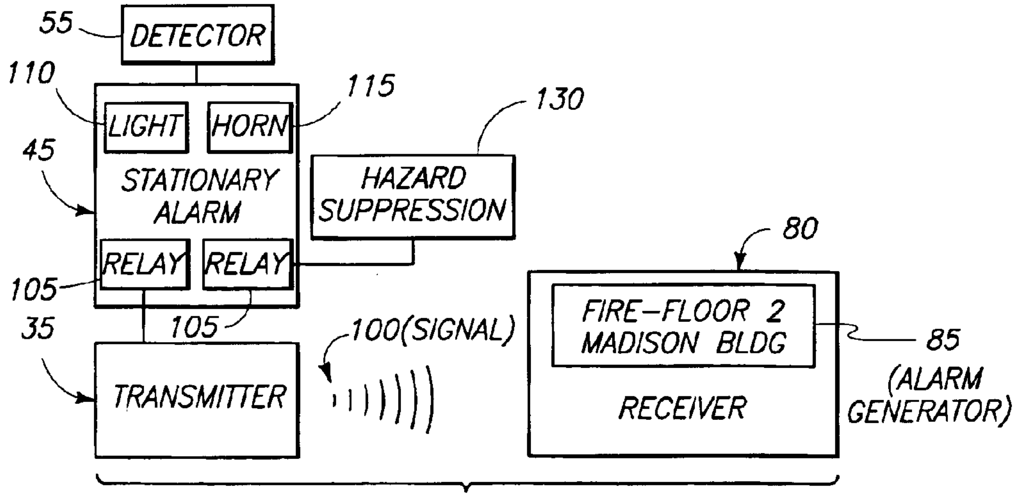
Figure 9:
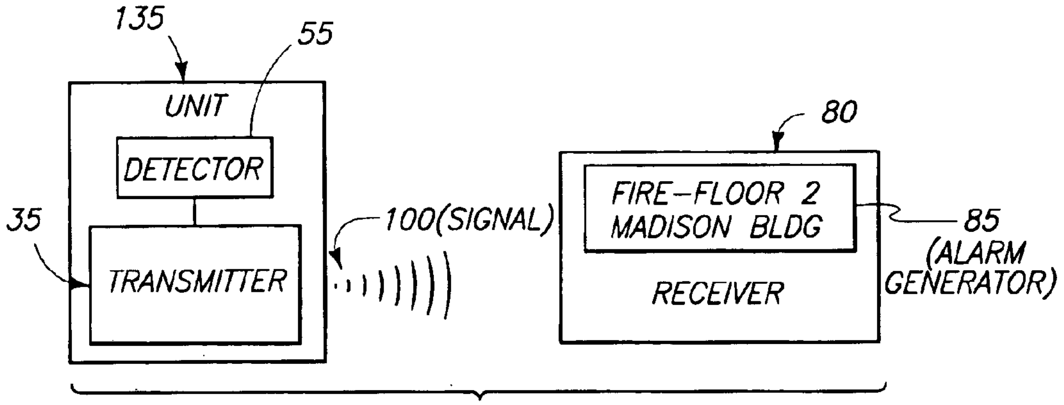

Given the capabilities of the present aspect of the invention, the alarm system might be associated with a hazard condition detector 55, as shown in FIGS. 1–10. Accordingly, the alarm system can further include at least one hazard condition detector that prompts the alarm transmitter to send the alarm code after identifying at least one hazard condition, as exemplified at least by FIGS. 1 and 2. The detector can identify at least one of a fire condition, a carbon monoxide condition, a security breach condition, and an emergency broadcast condition, as well as other conditions. The alarm transmitter can be wired to the detector via a stationary alarm generator 45, as shown in FIGS. 1 and 6–8, or in another manner. For example, detector 55 and second transmitter 35 may be combined in a single unit 135, as shown in FIG. 9. The alarm transmitter can transmit the alarm code when the stationary alarm generator provides a second alarm. Thus, an existing alarm system can be used to actuate transmission of an alarm code. Alarm systems generally include a plurality of stationary alarm generators, such as strobe lights and/or horns to provide a fire alarm, etc. An alarm transmitter of the present aspect of the invention can be wired to such an alarm generator such that an electrical signal received by the stationary alarm generator is extended to an alarm transmitter generating the alarm code.

Often, existing alarm systems are based on either a 12 volt or a 24 volt system. To readily adapt an existing alarm system to the present aspect of the invention, a replacement stationary alarm generator might be desirable. A stationary alarm generator that can be readily adapted to either a 12 or 24 volt existing alarm system is particularly useful. Alternating between the two voltage systems can be accomplished merely by an internal switch or perhaps another device. The stationary alarm generator can further include at least one of a light and a horn. By providing a class C relay with the replacement stationary alarm generator, an alarm transmitter can be wired to the replacement generator via the relay. As known to those skilled in the art, a class C relay 105, such as shown in FIGS. 7 and 8, includes a relay that can be considered normally open as well normally closed. Accordingly, the alarm generator can be adapted to particular needs of the existing system. By providing a second class C relay 105, add-on hazard suppression equipment 130 shown in FIG. 8 can be linked to the existing alarm system through the alarm generator. Hazard suppression equipment includes automatic door, window, and vent closures, etc., particularly in the case of fire suppression.

Accordingly, another aspect of the invention provides an alarm system retrofitting method that includes linking at least one added wireless alarm transmitter with an existing alarm system. The link can allow an alarm actuation signal of the existing alarm system to be extended to the wireless alarm transmitter. The method further includes providing at least one added wireless activate transmitter and providing at least one added wireless signal receiver in keeping with the descriptions herein.

A variety of linking means can be suitable for use in the retrofitting method. Preferably, the linking includes linking the alarm transmitter with at least one existing stationary alarm generator comprised by the existing alarm system. However, the alarm transmitter might be linked with other features of an existing alarm system. Examples include an alarm control panel that actuates alarm generators when a detector identifies a hazard condition and/or an alarm indication panel that names an area where a detector identifies a hazard condition, such as panel 120 shown in FIG. 5. The link to the existing stationary alarm generator preferably includes wiring, but can instead include a wireless link or other forms of a suitable link. The linking can also preferably include linking at least one added stationary alarm generator with the existing alarm system and linking the alarm transmitter with the added stationary alarm generator. As an example, the added stationary alarm generator can include a 12/24 volt alarm generator further including at least one of a light 110 and a horn 115, shown in FIG. 7 and 8. The alarm transmitter can be wired to the added stationary alarm generator via a class C relay 105.

Figure 6:
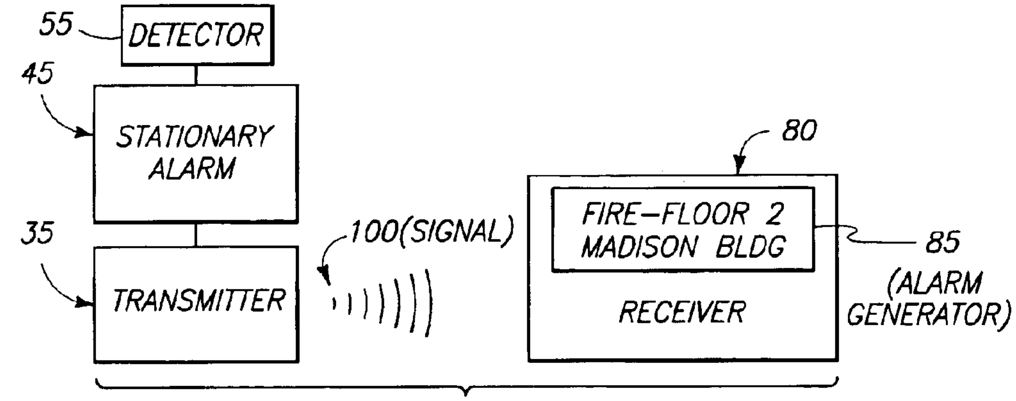

FIG. 1 shows a stationary alarm generator 45 having lights 50 positioned on a wall of first structure 10. Stationary alarm generator 45 is linked (as shown in FIGS. 6–8) to a detector 55. Typically, the link between stationary alarm generator 45 and detector 55 includes a wiring system. However, such link can also wireless. Second transmitter 35, preferably providing an alarm code, is shown wired to stationary alarm generator 45 by wiring 40. Although simple wiring 40 is preferred, the link between second transmitter 35 and stationary alarm generator 45 can also be wireless. A presumption exists that, in most circumstances, a sufficient number of stationary alarm generators, such as generator 45, will exist at appropriate locations of a structure such that one or more alarm transmitters, such as second transmitter 35, can be appropriately positioned using wiring 40. If appropriate positions can not be identified as indicated, the link between second transmitter 35 and generator 45 being wireless can reduce the cost of providing a supplemental wiring system. The ease of retrofitting existing alarm systems enhances the value of an alarm system in keeping with the aspects of the invention described herein.

Figure 4:
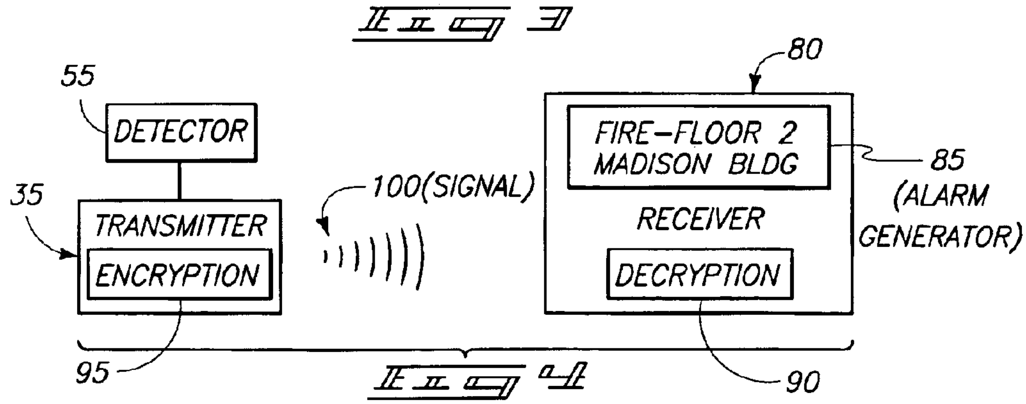
Figure 5:
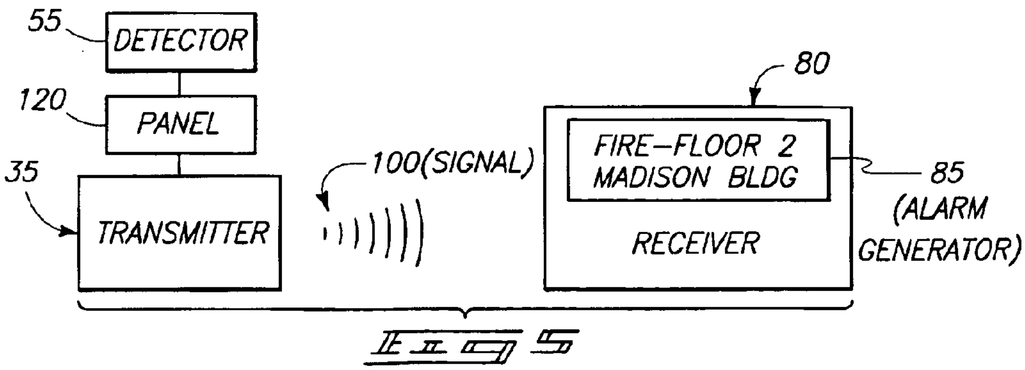

The present alarm system can be further enhance by providing additional features. One advantageous feature provides an alarm transmitter and an activate transmitter each further including a code encryption device 95 and a signal receiver further including a code decryption device 90, such as shown in FIG. 4. By encrypting the transmitter alarm code and activate code, additional security can be incorporated into the alarm system by preventing detection and unauthorized transmission of the alarm code or activate code.

As an additional improvement, the system can include at least one wireless emergency broadcast transmitter separate from the alarm transmitter. The signal receiver can be continuously sensitized to an emergency broadcast code from the emergency broadcast transmitter.

Figure 10:
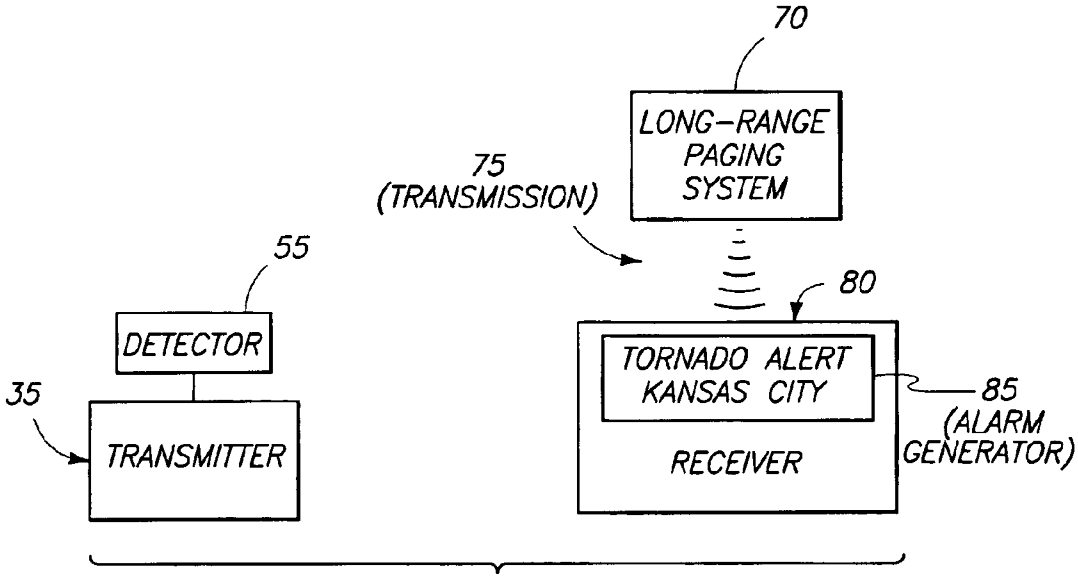

A variety of devices can be used to link the alarm transmitter with the Emergency Broadcast System. As one example, the signal receiver can be adapted to also receive transmissions 75 from a long range or satellite-based paging system 70, as shown in FIG. 10. The Emergency Broadcast System can then coordinate with existing paging networks to provide an emergency broadcast code to the signal receiver. In such case, the emergency broadcast transmitter would function as part of an existing paging network. The signal receiver could be capable of receiving an emergency broadcast code anywhere within the existing paging network.

As another alternative, a separate emergency broadcast transmitter can be linked to a local hazard condition detector that prompts the alarm transmitter to send the alarm code. The separate emergency broadcast transmitter can then exhibit an effective transmission range similar to the effective transmission range of the alarm transmitter. Still further, as indicated above, the hazard condition detector can prompt the alarm transmitter after identifying an emergency broadcast condition. Such can be accomplished by providing a hazard condition detector adapted to monitoring transmission of Emergency Broadcast System signals in the event of an emergency.

As another improvement, the alarm system can further include at least one wireless residential alarm transmitter separate from the above indicated alarm transmitter. The signal receiver can be continuously sensitized to a residential alarm code from the residential alarm transmitter. The alarm system described above including an alarm transmitter and an activate transmitter can be provided in a residential setting. However, a less costly, but adequate, residential alarm transmitter can be provided in a residential setting. By providing a signal receiver that is continuously sensitized to a residential alarm code, the possibility exists for false alarms from neighboring residential alarm transmitters. However, given the typically smaller size of a residential structure, less difficulty exists with verifying the accuracy of a generated alarm. Still, improved protection over existing light only residential alarm systems can be provided to the hearing impaired and others when the signal receiver includes motion as an alarm. The effective transmission range of the residential alarm transmitter can be limited to reduce the likelihood of false alarms from residential structures beyond adjoining neighbors.

Given the modern advances in wireless signal receivers, such as personal paging devices, it is even conceivable that the concept of the residential alarm system just described might be used on a broader scale. For example, an alarm system can include at least one wireless alarm transmitter and at least one hazard condition detector equipped to prompt the alarm transmitter to send an alarm code after identifying at least one hazard condition. At least one wireless signal receiver may be provided that is equipped to recognize the alarm code, the signal receiver including an alarm generator equipped to provide at least a text alarm as a first alarm after recognizing the alarm code. The text alarm may name a location of the hazard condition detector that identified the hazard condition.

Thus, the alarm generator of a signal receiver can provide at least a text alarm naming a location, regardless of whether the signal receiver recognized an activate code or is even capable of recognizing an activate code. Additional alarms of light, motion, and/or sound might be selected based on user preferences. Common personal pagers include a LCD display that can name a structure, structure address, and/or some other indication of hazard condition location from which an alarm code may be sent by an alarm transmitter. One example of a suitable personal pager includes a Motorola T900 that features a multiple line display. Other pagers and displays may also be suitable.

The location named in the text alarm can be a limited or general access structure or the hazard condition location might not even be within a structure. A user may confirm the location of the hazard condition merely by checking the text alarm. Such a feature may even be preferred by some users that wish to know of hazard conditions in a general area, even though the condition exists in a neighboring location rather than their particular location.

A single alarm transmitter or multiple transmitters might be selected and positioned to produce an effective transmission range intentionally encompassing an area outside the location to which the transmitter(s) are assigned. Users outside the location may then be certain of receiving an alarm code. Instead, the effective transmission range might only encompass the assigned location, but intermittent reception can exist outside the assigned location. In either case, the concern over false alarms from neighboring alarm transmitters is minimal given the ability to confirm location by checking the text alarm.

Most or all of the features described herein for alarm systems that include activate transmitters (FIG. 1) are also compatible with alarm systems lacking an activate transmitter but including a text alarm naming a hazard location (FIGS. 2–10). Notably, a large variety of options exist that may be incorporated into any alarm system in keeping with the present aspects of the invention. Some combinations of specific features can be more preferred than others.

Accordingly, in one preferred aspect of the invention, an alarm device can include a wireless hazard signal receiver that becomes sensitized to recognize a wireless transmitted hazard alarm code only after recognizing a wireless transmitted activate code. An alarm generator can provide a hazard alarm after recognizing the alarm code. The alarm device can further include an alarm code and activate code decryption device. The alarm code can include a combined location code and condition code and the activate code can include the location code, but not the condition code. Such an alarm device can at least be used in at least some of the various aspects of an alarm system described herein and perhaps have other uses.

One preferred aspect of an alarm system includes at least one wireless alarm transmitter positioned to exhibit an effective transmission range encompassing at least a portion of a first structure. The alarm system can include at least one wireless activate transmitter exhibiting a lower transmission range in comparison to the alarm transmitter. The activate transmitter can be positioned to exhibit an effective transmission range substantially encompassing at least one entrance of the first structure while excluding any adjacent entrance of a second structure. At least a portion of the second structure can be outside the effective transmission range of the alarm transmitter. At least one wireless signal receiver included in the alarm system can become sensitized to recognize an alarm code from the alarm transmitter after recognizing an activate code from the activate transmitter. The signal receiver can include an alarm generator that provides an alarm after recognizing the alarm code. The system can further include at least one hazard condition detector that prompts the alarm transmitter to send an alarm code after identifying at least one hazard condition. As one alternative, the first structure can include a limited access structure. It can be additionally advantageous for the alarm code to be unique to the first structure in comparison to structures within the same nation or continent, or within the world.

Another preferred combination of the above described various features produces another aspect of an alarm system including a plurality of wireless alarm transmitters, each including a code encryption device. The alarm transmitters can be positioned to exhibit a combined effective transmission range encompassing substantially all of a limited access first structure. The alarm system can include at least one activate transmitter, having a code encryption device. The activate transmitter can be placed at substantially all of at least one entrance of the first structure. The activate transmitter can exhibit a lower effective transmission range in comparison to an individual effective transmission range of at least one of the alarm transmitters. The activate transmitter can also be positioned such that the activate transmitter effective transmission range substantially encompasses the first structure entrance while excluding any adjacent entrance of a second structure. At least a portion of the second structure can be outside the combined effective transmission range of the alarm transmitters. At least one wireless signal receiver can be provided that becomes sensitized to recognize an encrypted alarm code from the alarm transmitter after recognizing an encrypted activate code from activate transmitter. The signal receiver can include an alarm generator that provides an alarm after recognizing the alarm code.

As a still further preferred combination of the various features, another aspect of the invention provides an alarm system that includes a first arrangement of wireless transmitters at entrances of a building. The first transmitter arrangement can provide an effective transmission range extending only throughout substantially all of any space through which the building may be entered and any portions of any space adjoining the entrances. A second arrangement of wireless transmitters in the building can provide a combined effective transmission range extending throughout substantially all of any space that may be occupied within the building. At least one wireless signal receiver can activate to recognize second data from the second transmitter arrangement after recognizing first data from the first transmitter arrangement as an indication of the signal receiver entering the building. The second data can actuate an alarm device of the signal receiver as an indication of a predetermined condition. As one example, the first transmitter arrangement can include different transmitters than the transmitters of the second transmitter arrangement. Further, the predetermined condition can include a hazard condition. The hazard condition can exist within the building, or circumstances may warrant actuating the alarm device for a hazard condition exterior of the building.

It is an advantage of at least some aspects of the present invention to account for overlapping alarm codes transmitted from alarm transmitters associated with adjoining or nearby structures. Sensitizing a signal receiver to recognize alarm codes from a particular structure upon entry of the structure helps reduce the likelihood of false alarms from structures not currently occupied by the signal receiver. Testing of transmission ranges of the alarm transmitters can assist in ascertaining that substantially all of any space that may be occupied is encompassed by the effective transmission range. Understandably, some portions of a structure might be a space that cannot be occupied. Encompassing such space can be optional. “Substantially all of any space that may be occupied” refers to spaces where a person in possession of a signal receiver is likely to enter. Understandably, the upper heights of tall ceilings, storage rooms or closets not normally occupied, and other spaces are examples of spaces where a person is not likely to enter. Such statement is true in context of the present document even though, for example, a maintenance person might intermittently enter the upper height of a tall ceiling to change light bulbs or intermittently step into a small storage area or closet to retrieve supplies. Accordingly, an adequate alarm system can be provided with a second transmitter arrangement combined effective transmission range extending throughout substantially all of any space that may be occupied.

In a similar note, placing an activate transmitter at “substantially all of at least one entrance” of a structure can be accomplished without placing an activate transmitter at every entrance. A window, an emergency exit, and other wall openings might be considered entrances. However, it is unlikely that a person will enter a structure at such potential entrances. Accordingly, an adequate alarm system can be provided merely by placing activate transmitters at substantially all of the entrances.

It appears possible that transmission ranges of the above mentioned alarm transmitters or second arrangement of transmitters might overlap with structures having entrances not encompassed by the transmission ranges of the activate transmitter or first arrangement of transmitters. Accordingly, when a signal receiver becomes sensitized, preferably the signal receiver provides an acknowledgment alarm. The acknowledgment alarm informs a user of sensitization to a particular structure. The signal receiver can remain sensitized to the particular structure until becoming sensitized to another different structure. Alternatively, the signal receiver can remain sensitized for a predetermined delay period, for example, twelve hours or more, such as about twenty-four hours. A user might leave a first structure to which the signal receiver is sensitized and enter a second structure. If no acknowledgment occurs upon entry of the second structure, the user can readily realize that the signal receiver remains sensitized to the first structure. If an alarm is generated, the user can further realize that the alarm applied to the first structure no longer occupied by the user. The signal receiver might even display the location code of the received alarm code as further identification of the alarm code source. If an acknowledgment alarm occurs upon entry of the second structure, then the user can realize that the signal receiver became sensitized to the second structure rather than the first structure.

The systems and devices according to various aspects of the invention described above, and potentially other systems and devices, can be used to accomplish alarm activation methods. According to one aspect of the invention, an alarm activation method includes transmitting an activate code from at least one wireless activate transmitter, recognizing the activate code with at least one wireless signal receiver, and after recognizing the activate code sensitizing the signal receiver to recognize at least one alarm code. The method can also include transmitting the alarm code from at least one wireless alarm transmitter and, after sensitizing the signal receiver, recognizing the alarm code with the signal receiver. After recognizing the alarm code, the method can provide a first alarm from an alarm generator comprised by the signal receiver. The transmitting of the activate code can include transmitting within a smaller range in comparison to the transmitting of an alarm code.

Other features of the alarm systems and devices described above can also be incorporated into the steps of the described alarm activation method. As one example, the alarm activation method can further include identifying at least one hazard condition with a detector. The detector can actuate the transmitting of the alarm code. In one alternative, the detector actuating the transmitting of the alarm code can include the detector actuating a second alarm from a stationary alarm generator. The stationary alarm generator can in turn actuate the transmitting of the alarm code. Such a step can be accomplished by a stationary alarm generator altering an electric current applied to the alarm transmitter via a class C relay of the stationary alarm generator. Accordingly, alteration of the electric current provides an indication to the alarm transmitter to provide the alarm code. Also, in a still further alternative, the method can include encrypting the activate code and the alarm code prior to the transmitting of such codes. Decryption of the activate code and the alarm code can occur prior to the recognizing of such codes.

Selected combinations of the method steps set forth above can be particularly advantageous. One aspect of a preferred invention provides an alarm activation method including transmitting an activate code from at least one wireless activate transmitter with an effective range substantially encompassing at least one entrance of a first structure, recognizing the activate code with at least one wireless signal receiver, and after recognizing the activate code sensitizing the signal receiver to recognize at least one alarm code. The method can include identifying at least one hazard condition with a detector, the detector actuating transmission of the alarm code, and transmitting the alarm code from at least one wireless alarm transmitter. The alarm transmitter can have an effective transmission range encompassing a portion of the first structure and excluding at least a portion of a second structure. The activate transmitter can exhibit a lower transmission range in comparison to the alarm transmitter and exclude any entrance of a second structure adjacent the entrance of the first structure. After sensitizing the signal receiver, the method can include recognizing the alarm code with the signal receiver, and, after recognizing the alarm code, providing an alarm from an alarm generator comprised by the signal receiver. As an alternative further feature, the first structure can include a limited access structure. Also, the alarm code can be unique to the first structure in comparison to structures within the same nation or continent, or within the world.

As another preferred aspect of the invention, an alarm activation method can include encrypting and transmitting an activate code with at least one wireless activate transmitter from substantially all of at least one entrance of a limited access first structure. The activate transmitter can have an effective transmission range substantially encompassing the first structure entrance. The method can also include recognizing the encrypted activate code with at least one wireless signal receiver and, after recognizing the encrypted activate code, sensitizing the signal receiver to recognize at least one alarm code. The alarm code can be encrypted and transmitted from a plurality of wireless alarm transmitters with a combined effective range encompassing substantially all of the first structure and excluding at least a portion of a second structure. The activate transmitter can exhibit a lower transmission range in comparison to an individual effective transmission range in at least one of the alarm transmitters. The activate transmitter effective transmission range can exclude any entrance of a second structure adjacent the entrance of the first structure. After sensitizing the signal receiver, the method can include recognizing the encrypted alarm code with the signal receiver and, after recognizing the encrypted alarm code, providing an alarm from an alarm generator comprised by the signal receiver.

A still further preferred aspect of the invention provides an alarm activation method that includes transmitting first data from a first arrangement of wireless transmitters at entrances of a building. The first transmitter arrangement can provide a combined effective transmission range extending only throughout substantially all of any space through which the building may be entered and any portions of any space immediately adjoining the entrances. The first data can be recognized with at least one wireless signal receiver and, after recognizing the first data, the method can include sensitizing the signal receiver to recognize second data. The second data can be transmitted from a second arrangement of wireless transmitters in the building. The second transmitter arrangement can provide a combined effective transmission range throughout substantially all of any space that may be occupied within the building. After sensitizing the signal receiver as an indication of the signal receiver entering the building, the second data can be recognized with the signal receiver. After recognizing the second data, the method can include providing an alarm from an alarm device comprised by the signal receiver as an indication of a predetermined condition. As one example, the predetermined condition can include a hazard condition. The hazard condition can exist within the building or, alternatively, exterior of the building.

In a further aspect of the invention, an alarm system network establishment method includes disseminating wireless first alarm transmitters and disseminating wireless signal receivers. The signal receivers can be continuously sensitized to a first alarm code from the first alarm transmitters and can include an alarm generator that provides a first alarm after recognizing a first alarm code. The method further includes promoting purchase and installation of alarm systems including wireless second alarm transmitters and wireless activate transmitters. The signal receivers can become sensitized to recognize a second alarm code from the second alarm transmitters after recognizing an activate code from the activate transmitters. The alarm generator can provide a second alarm after recognizing the second alarm code.

In establishing the alarm system network, the first alarm transmitters and signal receivers might be disseminated to hearing impaired persons. Such transmitters and receivers might alternatively or additionally be disseminated to sight impaired persons or others having a desire to use the described alarm system. The effectiveness and value of the described alarm system can be enhanced by wide spread installation of second alarm transmitters and wireless activate transmitters. Thus, a network of alarm systems can be established allowing persons that possess signal receivers to enter a large variety of structures with the knowledge that they can be notified of conditions pertaining to particular structures.

Accordingly, it is an advantage of the described network establishment method that signal receivers are disseminated to beneficiaries of an alarm system network. The value of the disseminated signal receivers is additionally enhanced by disseminating the described first alarm transmitters. The first alarm transmitters can include residential alarm transmitters, such as might be incorporated into residential fire alarm generators. Given the capabilities of signal receivers to produce multiple alarms, the second alarm can be different from the first alarm. Accordingly, an alarm from a residential alarm transmitter can be easily distinguished from other alarms. Persons receiving the signal receivers can use such devices daily in their own residence or somewhere else conducive to use of the first alarm transmitters. Because alarm system beneficiaries already possess and use the signal receivers, a strong motivation can exist to accept purchase and installation of alarm systems including second alarm transmitters and activate transmitters. Preferably, purchase and installation can be promoted to non-residential entities. Commercial organizations and governmental entities are preferred targets in promoting purchase and installation of the described alarm systems.

A further advantage of the establishment method includes improving the safety of facilities for disabled persons, one aim of the widely known Americans with Disabilities Act (ADA). The method can also include applying subsidies to the first alarm transmitters and signal receivers. The applied subsidies can be obtained from non-governmental entities. For example, manufacturers, installers, and/or retailers of the second alarm transmitters and activate transmitters might be willing to subsidize the less costly first alarm transmitters and signal receivers. The subsidies can increase widespread acceptance and demand for the additional, more costly components of the alarm system network.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An alarm system which provide hazard condition alarms via a plurality of personal paging devices collectively without regard to the paging devices individually, the alarm system comprising:

at least one wireless alarm transmitter;

at least one hazard condition detector equipped to prompt the alarm transmitter to send a single paging code after identifying at least one hazard condition; and a plurality of wireless signal receivers comprised by respective personal paging devices enabled to recognize the single paging code which addresses the plurality of paging devices collectively without regard to the paging devices individually, respective paging devices including an alarm generator equipped to provide at least a visually displayed text alarm as a first alarm after recognizing the paging code, and the text alarm naming a location of the hazard condition detector that identified the hazard condition.

2. The system of claim 1 further comprising at least one wireless alarm transmitter repeater.

3. The system of claim 1 wherein the alarm transmitter comprises a code encryption device and the plurality of signal receivers comprise respective code decryption devices.

4. The system of claim 1 wherein the alarm transmitter is wired to an alarm control panel or alarm indication panel and transmits the paging code after a detector identifies a hazard condition and notifies the control panel or indication panel.

5. The system of claim 1 wherein the alarm transmitter is wired to the detector via a stationary alarm generator and transmits the paging code after the stationary alarm generator provides a second alarm.

6. The system of claim 5 wherein the stationary alarm generator comprises a 12/24 volt alarm further comprising at least one of a light and a horn, the alarm transmitter being wired to the stationary alarm generator via a class C relay.

7. The system of claim 6 wherein the stationary alarm generator further comprises an additional class C relay suitable for wiring to hazard suppression equipment.

8. The system of claim 1 wherein the detector is combined with the alarm transmitter in a single unit.

9. The system of claim 8 wherein the detector comprises a smoke detector.

10. The system of claim 1 wherein the signal receiver is enabled to additionally receive network paging signals external of the at least one alarm transmitter, the network paging signals addressing receivers individually as part of a conventional paging network.

11. The system of claim 10 wherein the network paging signals comprise emergency broadcast signals.

12. An alarm system retrofitting method which produces an alarm system providing hazard condition alarms via a plurality of personal paging devices collectively without regard to the paging devices individually, the alarm system retrofitting method comprising:

linking at least one added wireless alarm transmitter with an existing alarm system, the link allowing an alarm actuation signal of the existing alarm system to be extended to the wireless alarm transmitter; and providing a plurality of added wireless signal receivers comprised by respective personal paging devices enabled to recognize a single paging code from the alarm transmitter which addresses the plurality of paging devices collectively without regard to the paging devices individually, respective paging devices including an alarm generator equipped to provide at least a visually displayed text alarm as a first alarm after recognizing the paging code, and the text alarm naming a location of a hazard condition detector that generated the alarm actuation signal.

13. The method of claim 12 wherein the linking comprises linking at least one added stationary alarm generator with the existing alarm system and linking the alarm transmitter with the added stationary alarm generator.

14. The method of claim 13 wherein the added stationary alarm generator comprises a 12/24 volt alarm further comprising at least one of a light and a horn, the alarm transmitter being wired to the added stationary alarm generator via a class C relay.

15. An alarm system operating in multiple locations and providing hazard condition alarms via a plurality of personal paging devices collectively without regard to the paging devices individually, the alarm system comprising:

at least one first wireless alarm transmitter and at least one second wireless alarm transmitter operating independently from the first alarm transmitter;

at least one first hazard condition detector equipped to prompt the first alarm transmitter to send a first paging code after identifying at least one hazard condition within a first space which may be occupied, the first paging code including a first location code;

at least one second hazard condition detector equipped to prompt the second alarm transmitter to send a second paging code after identifying at least one hazard condition within a second space which may be occupied and which is separate from the first space, the second paging code including a second location code which is different from the first location code; and a plurality of wireless signal receivers comprised by respective personal paging devices enabled to recognize both the first and second paging codes which address the plurality of paging devices collectively without regard to the paging devices individually, respective paging devices including an alarm generator equipped to provide at least a visually displayed text alarm as a first alarm after recognizing the first or second paging code and, based upon the respective first or second location code, the text alarm naming a location of the detector that identified the hazard condition.

16. The system of claim 15 wherein the alarm transmitter is wired to the detector via a stationary alarm generator and transmits the paging code after the stationary alarm generator provides a second alarm.

17. The system of claim 16 wherein the stationary alarm generator comprises a 12/24 volt alarm further comprising at least one of a light and a horn, the alarm transmitter being wired to the stationary alarm generator via a relay.

18. The system of claim 15 wherein the detector is combined with the alarm transmitter in a single unit.

19. The system of claim 18 wherein the detector comprises a smoke detector.

20. The system of claim 15 wherein the signal receiver is enabled to additionally receive network paging signals external of the at least one alarm transmitter, the network paging signals addressing receivers individually as part of a conventional paging network.

21. An alarm system which provides hazard condition alarms via a plurality of personal paging devices collectively without regard to the paging devices individually, the alarm system comprising:

at least one wireless alarm transmitter;

at least one hazard condition detector equipped to prompt the alarm transmitter to send a single paging code after identifying at least one hazard condition; and a plurality of wireless signal receivers comprised by respective personal paging devices enabled to recognize the single paging code which addresses the plurality of paging devices collectively without regard to the paging devices individually, respective paging devices including an alarm generator equipped to provide at least a visually displayed text alarm as a first alarm after recognizing the paging code.

22. An alarm system retrofitting method which produces an alarm system providing hazard condition alarms via a plurality of personal paging devices collectively without regard to the paging devices individually, the alarm system retrofitting method comprising:

linking at least one added wireless alarm transmitter with an existing alarm system, the link allowing an alarm actuation signal of the existing alarm system to be extended to the wireless alarm transmitter; and providing a plurality of added wireless signal receivers comprised by respective personal paging devices enabled to recognize a single paging code from the alarm transmitter which addresses the plurality of paging devices collectively without regard to the paging devices individually, respective paging devices including an alarm generator equipped to provide at least a visually displayed text alarm as a first alarm after recognizing the paging code.

23. An alarm system operating in multiple locations and providing hazard condition alarms via a plurality of personal paging devices collectively without regard to the paging devices individually, the alarm system comprising:

at least one first wireless alarm transmitter and at least one second wireless alarm transmitter operating independently from the first alarm transmitter;

at least one first hazard condition detector equipped to prompt the first alarm transmitter to send a first paging code after identifying at least one hazard condition within a first space which may be occupied;

at least one second hazard condition detector equipped to prompt the second alarm transmitter to send a second paging code after identifying at least one hazard condition within a second space which may be occupied and which is separate from the first space; and a plurality of wireless signal receivers comprised by respective personal paging devices enabled to recognize both the first and second paging codes which address the plurality of paging devices collectively without regard to the paging devices individually, respective paging devices including an alarm generator equipped to provide at least a visually displayed text alarm as a first alarm after recognizing the first or second paging code.

* * * * *